Sept. 17, 1929.  R. M. GILSON  1,728,558
LIGHT SIGNAL
Filed Nov. 9, 1926   2 Sheets-Sheet 1
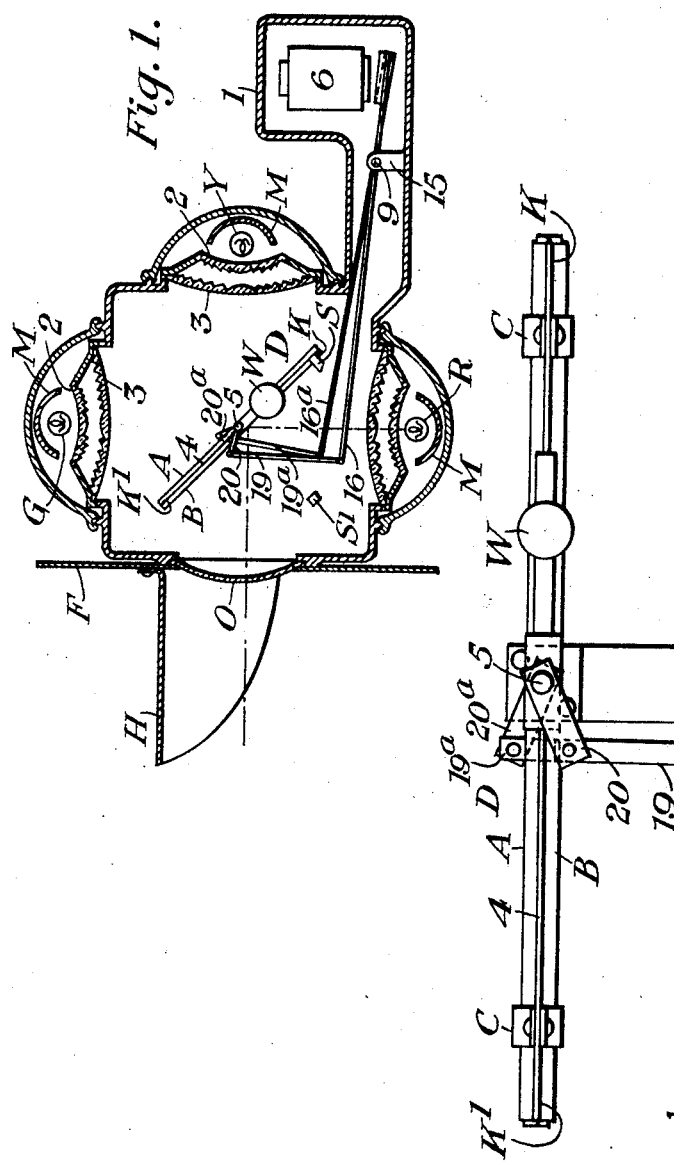
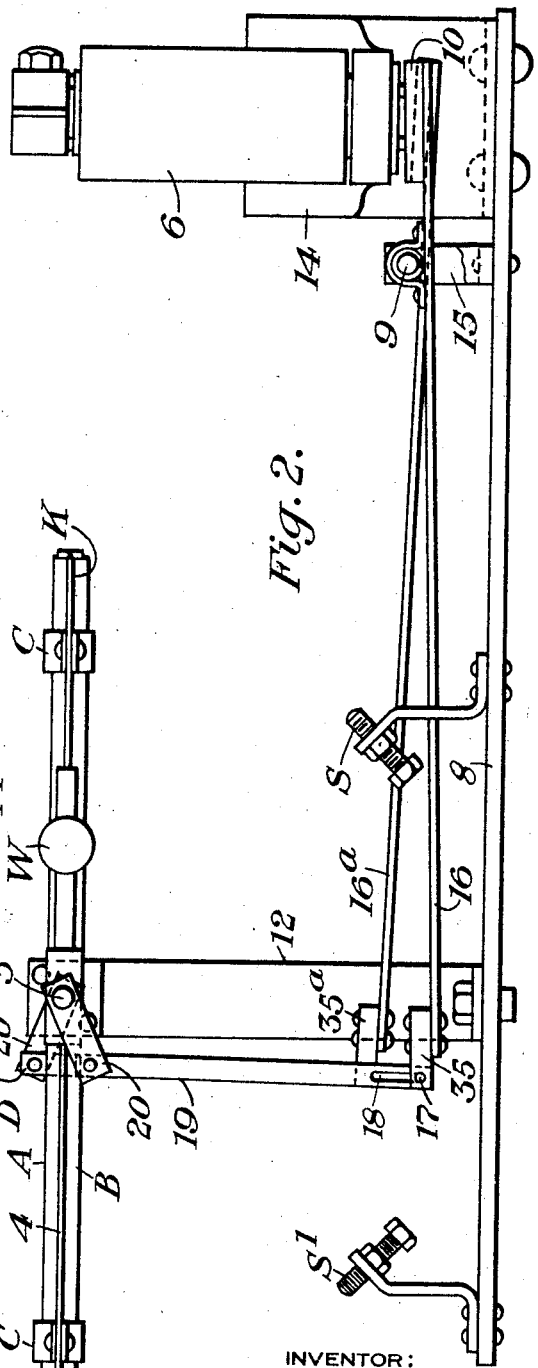
INVENTOR:
R. M. Gilson,
by A. R. Vencill
His Attorney Sept. 17, 1929.  R. M. GILSON  1,728,558
LIGHT SIGNAL
Filed Nov. 9, 1926    2 Sheets-Sheet 2
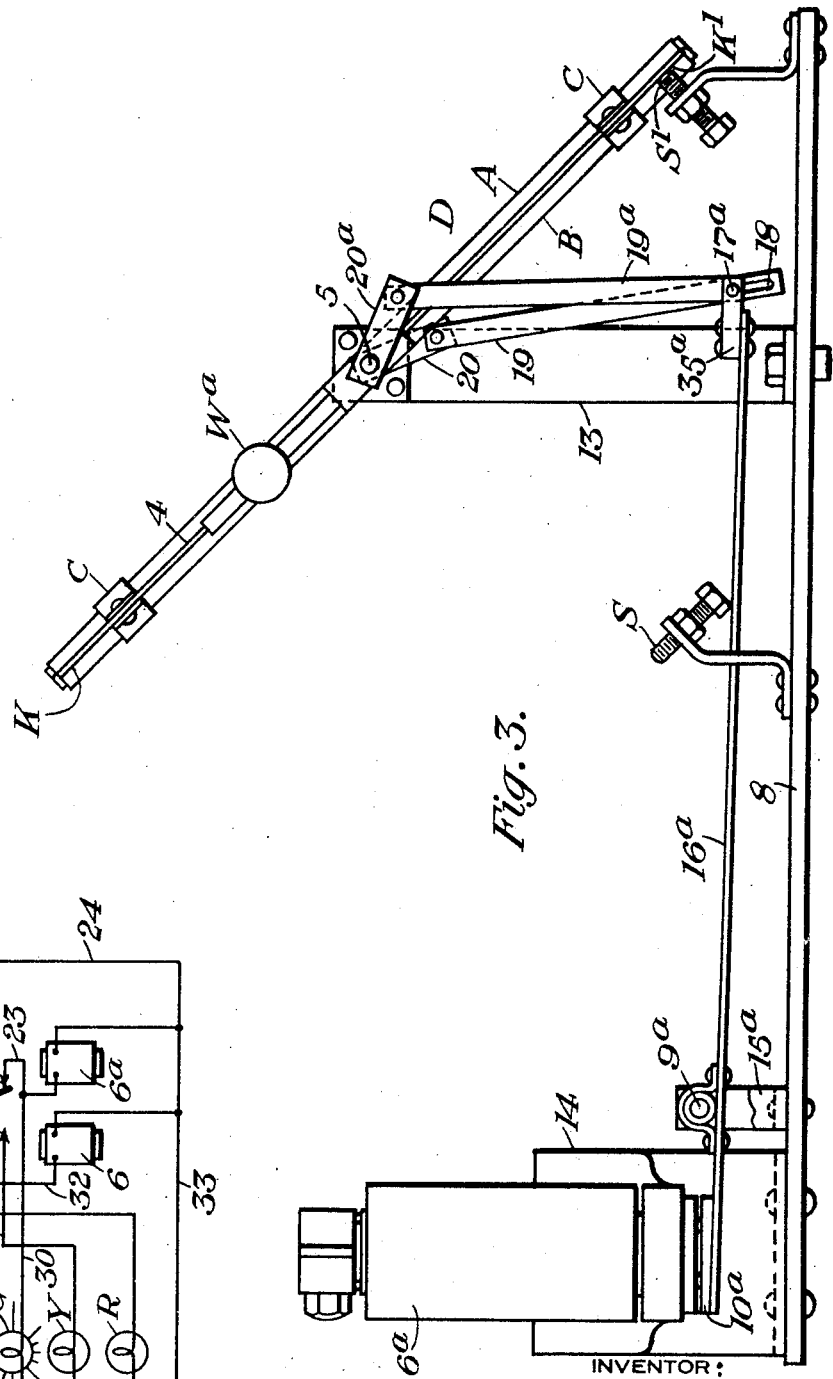

Patented Sept. 17, 1929

1,728,558

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed November 9, 1926. Serial No. 147,321.

My invention relates to light signals, and particularly to means for selectively projecting light from a plurality of sources onto a common area.

I will describe one form of light signal embodying my invention, and will then point out the novel features thereof in the claim.

In the accompanying drawings Fig. 1 is a side elevation, partly sectioned and partly diagrammatic, of one form of light signal embodying my invention. Figs. 2 and 3 are side elevations of the operating mechanism for the light signal shown in Fig. 1. Fig. 4 is a diagrammatic view showing one form of control circuit for the signal shown in the preceding views and embodying my invention.

Similar reference characters refer to similar parts in each of the several views.

Referring first to Fig. 1 the reference character 1 designates a casing for supporting the signal and its operating mechanism. Supported in the front end of the casing is a cover glass O through which the signal indication is displayed. This cover is here shown as a clear glass, but inasmuch as all light rays projected from the signal must pass through it, I shall refer to it herein as the objective. A shield H of suitable shape protects this cover glass from the direct rays of the sun, thus reducing possible glare from surface reflection. Abutting the forward end of the casing and supported thereon is a screen F, preferably of sheet metal and usually, though not necessarily painted black, one function of which is to provide a uniform background for receiving signal indications and thus increasing their visibility.

Mounted within the casing 1 in any suitable manner are three incandescent lamps G, Y and R and a light reflector D. For each lamp I provide a pair of lenses 2 and 3 arranged to project a beam of parallel rays from the lamp to the reflector D. These beams projected from the lamps G, Y and R may, for instance, be made green, yellow and red, respectively. Also associated with each lamp is a semi-circular mirror M which is so placed as to reflect the rays from the lamp onto the lenses 2 and 3. The lamp Y is mounted to send its rays parallel to the axis of the objective O and the lamps G and R are each displaced approximately ninety degrees from the lamp Y and are so mounted that they send their rays at right angles to the axis of the objective O.

The reflector D comprises a flat plate of metal 4 pivoted about an axis 5 and having secured on opposite sides thereof by means of suitable clamps C, two plane mirrors A and B, respectively. The plate 4 extends beyond the mirrors A and B to form projections K and K¹ for engaging suitable stops S and S¹ and limiting the rotation of the reflector. The plate 4 also carries counterweights W and Wª for the purpose of biasing the reflector to the position shown in Fig. 1. When the reflector D occupies the position shown in Fig. 1 the rays from lamp R are reflected from the mirror B onto the objective O. When the reflector D is moved to the horizontal position shown in Fig. 2, the rays from lamp Y pass directly, without reflection, to the objective O. If the reflector is moved to the position shown in Fig. 3 the projection K¹ engages the stop S¹ and the rays from lamp G are reflected from the mirror A onto the objective O. It will also be noted that in each position of the reflector D the rays from two of the lamps are prevented from reaching the objective so that the rays from only one lamp can reach the objective at one time.

The mechanism for rotating the reflector D is more clearly shown in Figs 2 and 3. Referring now to these views, the reference character 8 designates a suitable base plate upon which the actuating mechanism for reflector D is mounted. The shaft 5 which carries the reflector D is mounted upon the base plate 8 by means of brackets 12 and 13. The shaft 5 also has secured thereto arms 20 and 20ª. The arm 20 is pivotally secured to a link 19 having in its lower end a slot 18. Co-operating with slot 18 is a pivot 17 secured in a block 35 on a pivot lever 16. The lever 16 is fulcrumed about a pivot 9 supported on a bracket 15. The arm 20ª has operating mechanism similar to that of arm 20 and comprising a link 19ª, an actuating pivot 17ª and an actuating lever 16ª. The lever 16ª is fulcrumed at 9ª on a bracket 15ª secured to the base plate 8. The link 19ª is not slotted but cooperates with the pivot 17ª and block 35ª. For the purpose of actuating levers 16 and 16ª I provide two electromagnets 6 and 6ª secured to the base plate 8 by means of a bracket 14.

When both of the magnets are de-energized the reflector D occupies the position shown in Fig. 1 with the projection K engaging the stop S. In this position the pivot 17 is at the extreme lower end of the slot 18 in link 19. When the magnet 6 is energized to attract the armature 10, lever 16 rotates about pivot 9 causing the arm 20 to be pulled downwardly so as to tilt the reflector D until it occupies the horizontal position shown in Fig. 2. When this operation takes place the arm 20ª is also rotated in the same direction and the lever 16ª is moved to the position occupied by the lever 16 before magnet 6 is energized. When both of the magnets 6 and 6ª are energized the armature 10ª moves the lever 16ª so that the reflector D is tilted to such a position that the projection K¹ engages the stop S¹, as shown in Fig. 3. When the reflector is in this position the pivot 17 occupies its upper position in the slot 18 and the reflector is held in position against the action of the counterweights W and Wª by the magnet 6ª, lever 16ª, link 19ª and arm 20ª. It will now be clear that the magnet 6 moves the reflector D from the position of Fig. 1 to the horizontal position and that energization of both magnets 6 and 6ª moves the reflector to the extreme position of Fig. 3.

In the practical application of my invention to railway signal systems the lamps G, Y and R indicate "clear," "caution," and "stop," respectively, and may be controlled in any desired manner to indicate traffic conditions in advance of the signal as will be understood by those versed in the art of railway signaling. In this instance I have shown the control as being accompanied by a polarized relay as shown in Fig. 4. Referring now to Fig. 4 the reference character L designates a polarized relay which is provided with front and back neutral armature contacts designated 21 and 25, respectively, and normal and reverse polar contacts 22 and 28, which contacts control the supply of current from the battery E to the lamps G, Y and R and to the electromagnets 6 and 6ª. When the relay L is supplied with current of normal relative polarity the front contact 21 and the polar contact 22 are closed, but when this relay is supplied with current of reverse relative polarity the front contact 21 and the polar contact 28 are closed. When relay L is de-energized the back contact 25 is closed and the front contact 21 is open. The circuit for lamp G is from battery E through wire 11, front contact 21 of relay L, wire 31, polar contact 22, wires 23 and 30, lamp G and wires 33 and 24 back to battery. This circuit is closed only when the relay L is energized by current of normal relative polarity. The circuit for lamp Y is from battery E through wire 11, front contact 21 of relay L, wire 31, polar contact 28, wire 29, lamp Y and wires 33 and 24 back to battery. This circuit is closed only when the relay L is supplied with current of reverse relative polarity. The circuit for lamp R is from battery E through wire 11, back contact 25, wire 26, lamp R and wires 33 and 24 back to battery. This circuit is closed only when the relay L is de-energized. The circuit for magnet 6 is from battery E through wire 11, front contact 21, wires 31 and 32, winding of magnet 6 and wire 24 back to battery. This circuit is closed whenever the relay L is energized. The circuit for the magnet 6ª is from battery E through wire 11, front contact 21, wire 31, polar contact 22, wire 23, winding of electric magnet 6ª and wire 24 back to battery. This circuit is closed only when current of normal relative polarity is supplied to the relay L.

In describing the operation of my light signal I will first assume that current of normal relative polarity is supplied to the relay L, closing the front contact 21 and the polar contact 22 of this relay, and lighting the lamp G. Magnets 6 and 6ª are both energized, armatures 10 and 10ª are attracted and the parts are moved to the positions shown in Fig. 3. When the reflector D is in this position the rays of light from the lamp G are reflected from the mirror A onto the objective O, and at the same time the pathways for rays which would come from either lamp Y or lamp R by reflection or false energization are blocked. When current of reverse relative polarity is supplied to the relay L, front contact 21 and polar contact 28 of the relay will be closed so that the lamp Y is lighted, magnet 6 is energized and the reflector D is tilted to the horizontal position, as shown in Fig. 2. With the reflector in this position the rays from lamp Y will pass directly to the objective O without reflection, and the possibility of a false indication being given by lamps G and R is avoided. When the relay L is de-energized so as to close its back contact 25 and to open both of its polar contacts the lamp R is lighted and both magnets 6 and 6ª are de-energized so that the counterweights W and Wª move the reflector to the position shown in Fig. 1. With the reflector in this position the rays from lamp R will be reflected from the surface of the mirror B onto the objective O and at the same time the paths from lamps G and Y to the objective will be completely obstructed.

It will now be seen that my invention avoids the necessity for providing a separate objective for each lamp, and not only renders it impossible for a proceed indication to be given when an open circuit occurs but also that the reflector directs the rays from the lighted lamp onto the objective and simultaneously prevents rays from other sources from reaching the objective.

Although I have herein shown and described but one form of light signal embodying my invention, it is understood that various changes and modifications may be made therein within the scope of the appended claim without departing from the spirit and scope of my invention.

Having thus described my invention, what I claim is:

A light signal comprising an objective, a first source of light located in the axial line of said objective, a second and a third source of light located on opposite sides of said axial line, said three sources differing in color, a pivotally mounted plane reflector having two reflecting surfaces located back to back and biased to occupy a position wherein it prevents light from said first source reaching said objective and wherein one of the reflecting surfaces directs light from said second source upon said objective, and means for swinging said reflector to a second position wherein the plane of the reflector is parallel to said axial line and so permits light from said first source to reach said objective, and to a third position wherein it prevents light from said first source reaching said objective and wherein the other reflecting surface directs light from said third source upon said objective.

In testimony whereof I affix my signature.

ROBERT M. GILSON.